US012711482B2

(12) United States Patent
Huang et al.

(10) Patent No.: US 12,711,482 B2
(45) Date of Patent: Aug. 18, 2026

(54) TRAINING A MODEL TO IDENTIFY ITEMS BASED ON IMAGE DATA AND LOAD CURVE DATA

(71) Applicant: Maplebear Inc., San Francisco, CA (US)

(72) Inventors: Yilin Huang, Shanghai (CN); Ganglu Wu, Hangzhou City (CN); Xiao Zhou, Shanghai (CN); Youming Luo, Shanghai (CN); Shiyuan Yang, Jersey City, NJ (US)

(73) Assignee: Maplebear Inc., San Francisco, CA (US)

( * ) Notice: Subject to any disclaimer, the term of this patent is extended or adjusted under 35 U.S.C. 154(b) by 80 days.

(21) Appl. No.: 18/974,543

(22) Filed: Dec. 9, 2024

(65) Prior Publication Data

US 2025/0104040 A1 Mar. 27, 2025

Related U.S. Application Data

(63) Continuation of application No. 17/874,956, filed on Jul. 27, 2022, now Pat. No. 12,205,098, which is a (Continued)

(51) Int. Cl.

*G06V 20/50* (2022.01)
*G01G 19/12* (2006.01)
(Continued)

(52) U.S. Cl.

CPC .......... *G06Q 20/208* (2013.01); *G01G 19/12* (2013.01); *G01G 19/40* (2013.01); *G06V 10/25* (2022.01);
(Continued)

(58) Field of Classification Search

CPC ...... G06Q 20/208; G01G 19/12; G01G 19/40; G01G 19/4144; G06V 10/25;
(Continued)

(56) References Cited

U.S. PATENT DOCUMENTS 8,371,504 B2 2/2013 Connelly
10,713,614 B1 * 7/2020 Manyam .............. G06Q 10/087
(Continued)

OTHER PUBLICATIONS

PCT International Search Report and Written Opinion, PCT Application No. PCT/CN2022/104146, Mar. 13, 2023, 8 pages.
(Continued)

*Primary Examiner* — Garcia Ade
(74) *Attorney, Agent, or Firm* — Fenwick & West LLP

(57) ABSTRACT

A smart shopping cart includes internally facing cameras and an integrated scale to identify objects that are placed in the cart. To avoid unnecessary processing of images that are irrelevant, and thereby save battery life, the cart uses the scale to detect when an object is placed in the cart. The cart obtains images from a cache and sends those to an object detection machine learning model. The cart captures and sends a load curve as input to the trained model for object detection. Labeled load data and labeled image data are used by a model training system to train the machine learning model to identify an item when it is added to the shopping cart. The shopping cart also uses weight data and the image data from a timeframe associated with the addition of the item to the cart as inputs.

20 Claims, 6 Drawing Sheets

Related U.S. Application Data continuation of application No. PCT/CN2022/104146, filed on Jul. 6, 2022.

(51) Int. Cl.

| | |
|---|---|
| ***G01G 19/40*** | (2006.01) |
| ***G06Q 20/20*** | (2012.01) |
| ***G06V 10/25*** | (2022.01) |
| ***G06V 10/778*** | (2022.01) |
| ***G06V 10/80*** | (2022.01) |

(52) U.S. Cl.

CPC .......... *G06V 10/778* (2022.01); *G06V 10/803* (2022.01); *G06V 20/50* (2022.01)

(58) Field of Classification Search

CPC .... G06V 10/778; G06V 10/803; G06V 20/50; G06V 10/764; G06V 10/82; G06V 20/52; G07G 1/0063; G07G 1/0072

See application file for complete search history.

(56) References Cited

U.S. PATENT DOCUMENTS

| | | | |
|---|---|---|---|
| 11,423,467 | B2 | 8/2022 | Bronicki |
| 11,636,457 | B1 | 4/2023 | De et al. |
| 11,893,866 | B1 | 2/2024 | Franklin et al. |
| 2013/0226718 | A1 | 8/2013 | Ascarrunz et al. |
| 2016/0026032 | A1 | 1/2016 | Moore |
| 2018/0218351 | A1* | 8/2018 | Chaubard ............ G06Q 20/208 |
| 2018/0330196 | A1 | 11/2018 | Chaubard et al. |
| 2019/0154492 | A1 | 5/2019 | Mcneally et al. |
| 2020/0104594 | A1* | 4/2020 | Zucker .................... H04W 4/35 |
| 2020/0226389 | A1* | 7/2020 | Hiramatsu ......... G06Q 30/0601 |
| 2021/0287013 | A1 | 9/2021 | Carter et al. |
| 2021/0407124 | A1 | 12/2021 | Hinek et al. |
| 2022/0005327 | A1* | 1/2022 | Cleper ................. G06K 7/1413 |
| 2022/0067390 | A1 | 3/2022 | Khalili et al. |
| 2022/0165046 | A1 | 5/2022 | Meidar et al. |
| 2022/0230216 | A1* | 7/2022 | Buibas ................... G06Q 30/02 |
| 2023/0021719 | A1* | 1/2023 | Hahamy ........... G01G 19/4144 |
| 2023/0087587 | A1* | 3/2023 | Yang .................. G01G 19/4144 705/23 |
| 2023/0145313 | A1 | 5/2023 | Gong et al. |
| 2023/0147385 | A1* | 5/2023 | Hagen .................. G06Q 20/208 705/23 |

OTHER PUBLICATIONS

United States Office Action, U.S. Appl. No. 17/874,987, Apr. 24, 2024, 18 pages.

United States Office Action, U.S. Appl. No. 17/874,956, May 8, 2024, 23 pages.

AU Office Action Mailed on Oct. 17, 2025 for AU Application No. 2022468820, 4 page(s).

Extended European Search Report Mailed on Oct. 28, 2025 for EP Application No. 22949783, 8 page(s).

Falcao et al., "FAIM: Vision and Weight Sensing Fusion Framework for Autonomous Inventory Monitoring in Convenience Stores", Frontiers in Built Environment, vol. 6, Oct. 22, 2020, XP093325918.

United States Office Action, U.S. Appl. No. 17/874,987, Feb. 24, 2025, 14 pages.

* cited by examiner

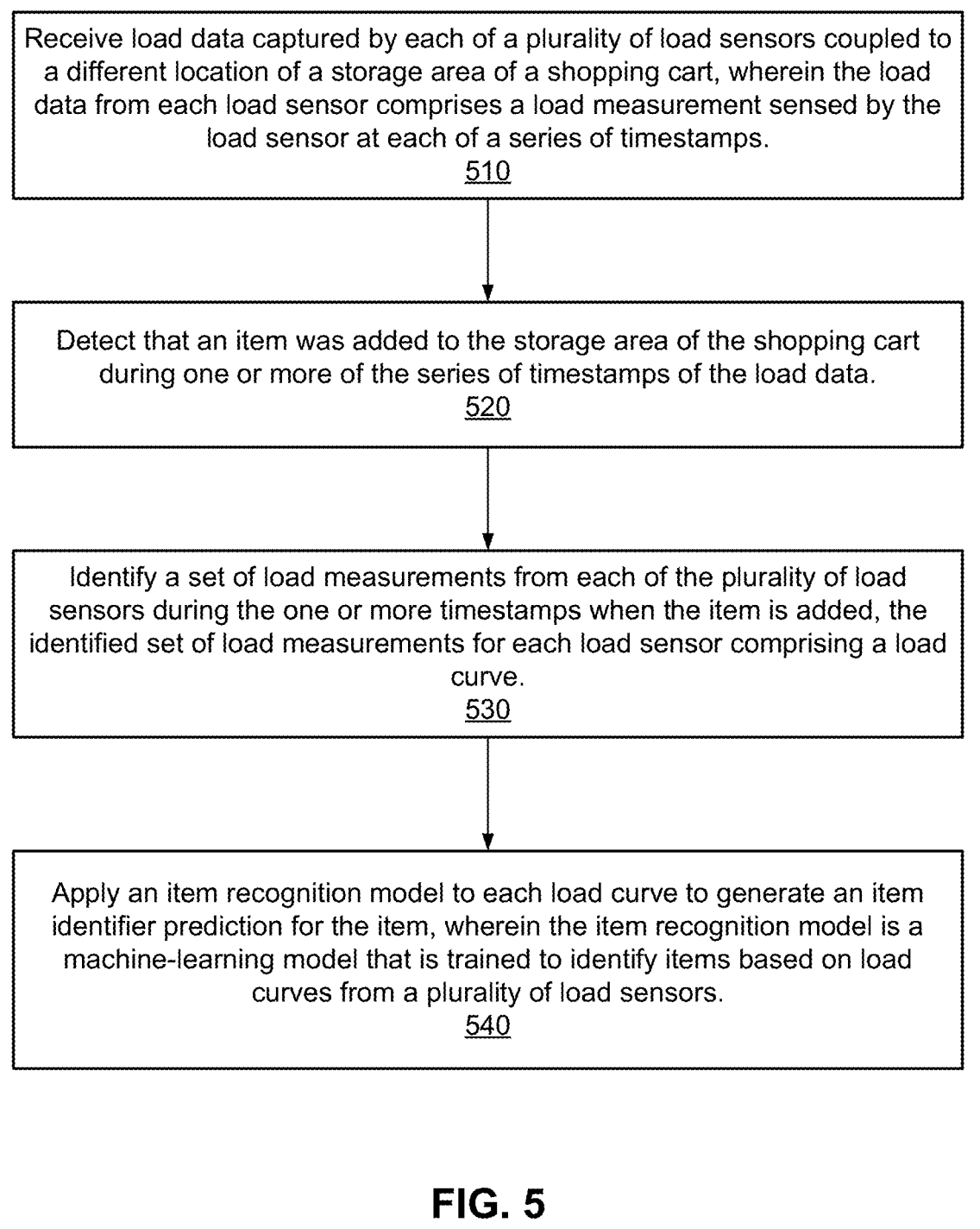

Receive load data captured by each of a plurality of load sensors coupled to a different location of a storage area of a shopping cart, wherein the load data from each load sensor comprises a load measurement sensed by the load sensor at each of a series of timestamps.
510

Detect that an item was added to the storage area of the shopping cart during one or more of the series of timestamps of the load data.
520

Identify a set of load measurements from each of the plurality of load sensors during the one or more timestamps when the item is added, the identified set of load measurements for each load sensor comprising a load curve.
530

Apply an item recognition model to each load curve to generate an item identifier prediction for the item, wherein the item recognition model is a machine-learning model that is trained to identify items based on load curves from a plurality of load sensors.
540

FIG. 5

TRAINING A MODEL TO IDENTIFY ITEMS BASED ON IMAGE DATA AND LOAD CURVE DATA

CROSS-REFERENCE TO RELATED APPLICATIONS

The present application is a continuation of co-pending U.S. patent application Ser. No. 17/874,956, filed Jul. 27, 2022, which is a continuation application of Patent Cooperation Treaty (PCT) International Application No. PCT/CN2022/104146 filed on Jul. 6, 2022, with the China National Intellectual Property Office as the receiving office, which is herein incorporated by reference.

BACKGROUND

This disclosure relates generally to computer-implemented item recognition and more particularly to classification of items in a storage area of a shopping cart using machine learning models.

Automated checkout systems allow a customer at a brick-and-mortar store to complete a checkout process for items without having to go through a cashier. These systems may allow users to complete a checkout process through a shopping cart that a user uses to carry items. Conventional automated checkout systems require users to scan a barcode on an item through a barcode scanner coupled to the shopping cart. However, these systems can be difficult for a user to use, and do not work well when labels cannot be affixed to an item (e.g., when purchasing bulk goods). It would be beneficial if the shopping cart could generate an inventory of items in the storage area of the cart basket without the need for a user to scan the items.

Existing computer vision models that are used to identify items added to a shopping cart often fail to identify items that are added quickly (creating blurred images) and these models are also unable to accurately identify a newly added item among other items that were previously added to the shopping cart. For example, a model that relies on images of items that have been placed in the cart may have difficulty identifying new items, because the other items may have shifted since the new item was added, blocking the view of the new item from the camera. Furthermore, cameras and image systems require large amounts of memory and power resources to continuously analyze each image frame. This resource draw is unsupportable for a moving system such as a shopping cart which relies on a rechargeable battery to function.

SUMMARY

A detection system uses load sensor data and image data to identify items that are added to a shopping cart. A shopping cart includes multiple load sensors that measure the weight of its storage area. The shopping cart also includes cameras that capture image data of the storage area. When the shopping cart detects that an item has been added to the storage area, the shopping cart captures load data from the multiple load cells and image data from the cameras. The shopping cart then applies the trained machine-learning model to the load data and the image data to identify the item that is added to the cart based on the load data and the image data. The shopping cart adds the identified item to a shopping list for the user.

To train a model to identify items that are added to the shopping cart, the system accesses a set of labeled training examples. Each training example describes an item being added to a cart and includes load data describing load values imparted by an item over a series of timestamps as the item is added to the storage area of the shopping cart and image data describing image frames of portions of the storage area of the shopping cart captured over the series of timestamps as the item is added to the storage area of the shopping cart. The detection system applies the model to the training examples to produce an output value identifying the item that was added to the shopping cart. To generate a loss value, the system compares the predicted output value to the labels on the training data. The parameters of the model are updated based on the loss and the parameter values are stored for later use in identifying items in a shopping cart.

With this model, the shopping cart system uses load data to identify portions of images that are most likely to contain the newly added item. Thus, the system does not need to continuously analyze all incoming image data, but instead uses processing resources only to analyze the most relevant image frames for the item detection. Additionally, since the load sensor data provides information about where in the cart a new item was added, the model is less likely to confuse the newly added item with other items in the shopping cart during item identification.

In accordance with one or more aspects of the disclosure, a shopping cart includes multiple load sensors that measure the weight of its storage area. The shopping cart also includes cameras that capture image data of the storage area. When the shopping cart detects that an item has been added to the storage area, the shopping cart captures load data from the multiple load cells. The shopping cart then applies a machine-learning model that is trained to identify the item that was added to the cart based on the load data.

Rather than continuously analyzing the load sensor data, the shopping cart system uses the load curves of the load sensor data to determine a timeframe that is most likely to be associated with an item being added to the shopping cart. Once a timeframe has been identified, the machine learning models need only to access and analyze load sensor data from within the determined timeframe to identify the item that was added to the shopping cart.

BRIEF DESCRIPTION OF THE DRAWINGS

FIG. 5 is a flowchart illustrating an example method for identifying an item added to a shopping cart using a load identification module, in accordance with one or more example embodiments.

Figure 1:
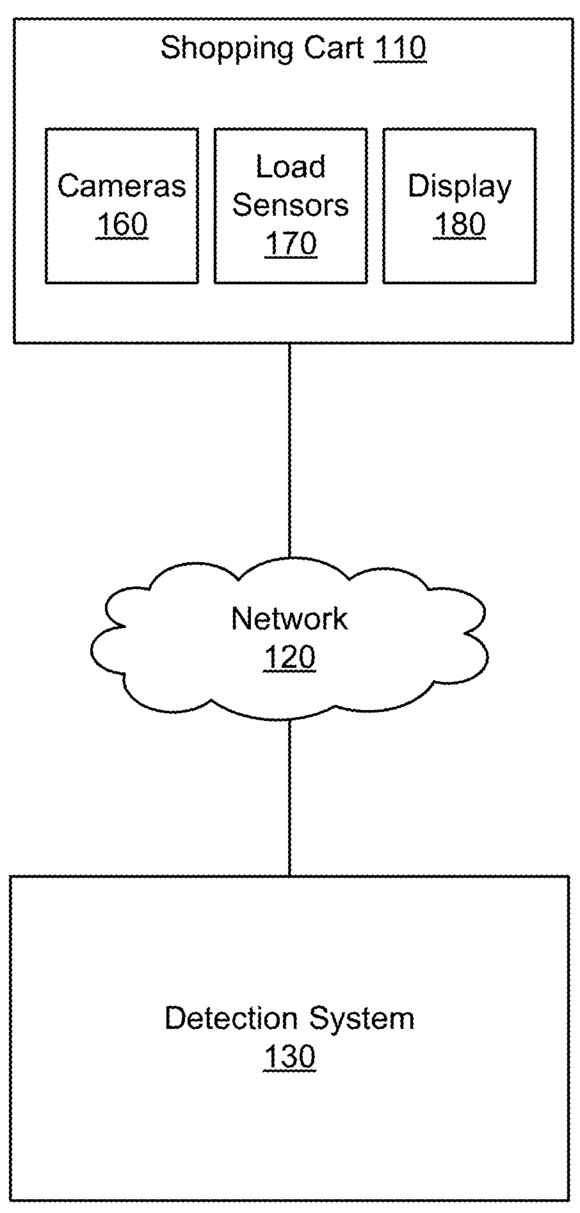
FIG. 1 is a high-level block diagram of a system environment for an item detection system, in accordance with one or more example embodiments.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict various embodiments for purposes of illustration only. One skilled in the art will readily recognize from the following description that alternative embodiments of the structures and methods illustrated herein may be employed without departing from the principles of the disclosure described herein.

DETAILED DESCRIPTION

Figure (FIG. 1 is a high-level block diagram of a system environment for an item detection system, in accordance with one or more example embodiments. FIG. 1 includes a shopping cart 110, a network 120, and a detection system 130. The shopping cart 110 includes one or more cameras 160, one or more load sensors 170, and a display 180. For clarity, only one shopping cart 110 is shown in FIG. 1. However, alternative embodiments of the system environment can have any number of shopping carts 110 and could include multiple detection systems 130. The functions performed by the various entities of FIG. 1 may vary in different embodiments. The detection system 130 manages detection of items being added to (or removed from) a shopping cart 110 and also identifies the item that was added to (or removed from) the shopping cart 110.

The shopping cart 120 is a vessel that a user can use to hold items as the user travels through a store. The shopping cart 110 includes a storage area for holding items. Additionally, the shopping cart 110 includes cameras 160, load sensors 170, and a display 180.

The one or more cameras 160 capture image data of the storage area of the shopping cart 110. Depending on the embodiment, the cameras 160 may be pointed at the bottom of the shopping cart storage area to view the current contents of the shopping cart 110, may be pointed across the opening of the shopping cart 110 storage area to capture images of items as they are added or removed from the shopping cart 110, or the cameras may be set up in some other combination of configurations. As an example, a shopping cart 110 may include four cameras 160, one attached at each corner of the storage area of the shopping cart 110. In some configurations, the cameras 160 record image data continuously as the shopping cart 110 is in use. In other embodiments, the shopping cart 110 may include some triggering mechanism, such as a light sensor, an accelerometer, or another sensor to determine that a user is about to add an item to the cart or about to remove an item from the shopping cart 110, wherein the triggering mechanism causes the cameras 160 to begin recording for some amount of time, for example a preset time range.

The one or more load sensors 170 capture load data for the shopping cart 110. In one embodiment, the one or more load sensors 170 may be scales that detect the weight (i.e., load) of the contents in the storage area of the shopping cart 110. The load sensors 170 can also capture load curves, that is, the load signal produced over time as an item is added to the cart or removed from the cart. The load sensors 170 may be attached to the shopping cart 110 in various locations to pick up different signals that may be related to items being added at different positions of the storage area. For example, a shopping cart 110 may include a load sensor 170 at each of the four corners of the bottom of the storage area of the shopping cart 110. In some embodiments, the load sensors 170 may record load data continuously as the shopping cart 110 is in use. In other embodiments, the shopping cart 110 may include some triggering mechanism, such as a light sensor, an accelerometer, or another sensor to determine that a user is about to add an item to the cart or about to remove an item from the shopping cart 110, wherein the triggering mechanism causes the load sensors 170 to begin recording for some amount of time, for example a preset time range.

The shopping cart 110 may include a display 180 through which the user can interact with information about the contents of the cart, such as via an automated checkout system. For example, the user can use a user interface presented on the display 180 to adjust the items in their shopping list, to view and confirm the items that the detection system 130 has detected in the storage area of the shopping cart 110, or to provide payment information for a checkout process.

In some embodiments, a user can also or alternatively interact with the shopping cart 110 information through a client device (not shown) such as a personal or mobile computing device, a smartphone, a tablet, a laptop computer, or desktop computer. In some embodiments, the client device executes a client application that uses an application programming interface (API) to communicate with the shopping cart 110 through the network 120.

The detection system 130 uses the information obtained from the cameras 160 and the load sensors 170 to generate predictions about what items are being held in the storage area of the shopping cart 110. The detection system 130 may be a computing system located on the shopping cart 110 or some or all functions of the detection system 130 may execute at a remote system in communication with the shopping cart 110. The detection system 130 uses the image frames captured by the cameras 160 and the load value captured by the load sensors 170 as inputs for machine learning models that are trained to identify items that a user has added to the shopping cart 110. Additional details of the detection system 130 are presented in the description of FIG. 2.

The shopping cart 110 and the detection system 130 can communicate via the network 120, which may comprise any combination of local area and wide area networks employing wired or wireless communication links. In some embodiments, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted. In some embodiments, the network 120 may include Bluetooth or near-field communication (NFC) technologies or protocols.

Figure 2:
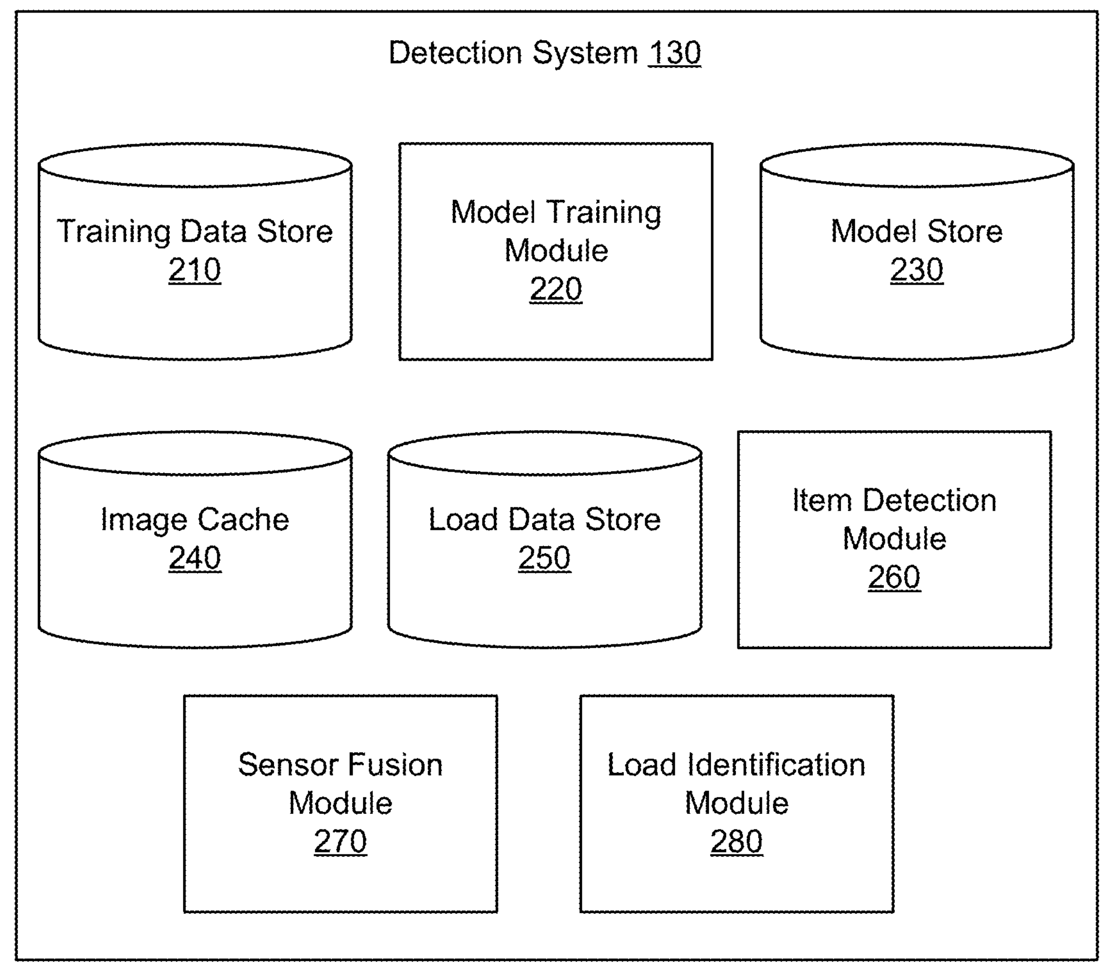
FIG. 2 is a high-level block diagram of a system architecture for the detection system, in accordance with one or more example embodiments.

FIG. 2 is a high-level block diagram of a system architecture for the detection system 130, in accordance with one or more example embodiments. The detection system includes various modules and data stores to identify items in the shopping cart 110 and to train detection and identification models. The detection system 130 comprises a training data store 210, a model training module 220, a model store 230, an image cache 240, a lead data store 250, an item detection module 260, a sensor fusion module 270 and a load identification module 280. Computer components such as web servers, network interfaces, security functions, load balancers, failover servers, management and network operations consoles, and the like are not shown so as to not obscure the details of the system architecture.

Additionally, the detection system 130 may contain more, fewer, or different components than those shown in FIG. 2 and the functionality of the components as described herein may be distributed differently from the description herein.

The training data store 210 stores data that can be used by the model training module 220 to train machine learning models for the detection system 130. The training data includes load data and image data. The example load data may include load data from a plurality of load sensors 170 that are coupled to the storage area of a shopping cart. The load data from each load sensor 170 describes a load imparted by an item in the storage area at a different location of the storage area. Since the load sensors 170 may be placed in different positions in the storage area of the shopping cart (e.g., at each corner), the differences in load data received from each of the load sensors 170 when an item is added to the shopping cart 110 can be helpful for a model to determine where in the cart the item was placed. The example image data may include image frames captured from a plurality of cameras 160 coupled to the shopping cart. The image data from each camera 160 depicts the items within a field of view of a portion of the storage area of the shopping cart 110. In one embodiment, the load data and image data stored in the training data store 210 are labeled, for example with an identifier of the item with which it is associated. Labels on the training data also include time stamps that indicate when each load value or image frame was captured. In some cases, labels for the training data may include item identifiers, and bounding boxes (identifying the location of the item in image data). The training data may also be grouped into data sets such that multiple image frames and load data values are used together as training input for an item prediction. For example, images captured within a timeframe from each of the plurality of cameras 160 attached to the shopping cart 110 and load data captured within the same or a nearby time frame from each of the plurality of load sensors 170 may be used together as inputs for training a machine learning model to identify an item in the shopping cart 110. Since the training data may be data received over a time period, this may include multiple image frames from each of the cameras 160 and multiple load values from each of the load sensors 170, to represent the information that is collected over a time range during which an item is added to the shopping cart 110.

The model training module 220 trains machine learning models for the detection system 130 to use for detecting that items have been added to the shopping cart 110 and for identifying the type of item that is added to the shopping cart 110. In various embodiments, the model training module 220 trains models for use by the sensor fusion module and/or the load identification module 280. The model training module 220 accesses labeled training data from the training data store 210. The training data is used to train one or more types of machine learning models. In various embodiments, the model training module 220 may train rules-based models, neural network classifier models, or another type of model. The model training module 220 may train a machine learning model that can identify an item type based on input image frames and input load data. Additionally, in some embodiments, the model training module 220 may train a machine learning model to identify, based on the load data, a set of time frames from which to select image frames for item identification. In one embodiment, the model training module 220 may train a machine learning model to generate bounding boxes or to otherwise identify the location of an item in the images of the shopping cart 110 storage area. In some cases, in addition to training models that identify items that are added to the shopping cart 110, the model training module may additionally train models to identify items that have been removed from the shopping cart 110. Additional information about the model training process is included in the description of FIG. 4.

The model store 230 stores the models generated by the model training module 220. Storing the machine learning models includes storing trained model parameters, such as the weights for trained neural network models. The model training module 220 may access and update parameters of the models stored in the model store 230 periodically, as additional training data is received, or when training is otherwise instigated, such as by a system administrator. In some embodiments, trained model parameters from the model store 230 may be deployed to individual shopping carts 110 for local item detection. In other embodiments, the shopping carts 110 may transmit data to the input data from cameras 160 and load sensors 170 to a remote detection system 130 where the models can be accessed at a model store 230 and used to generate predictions about the items in the shopping cart 110.

The image cache 240 stores image frames received from the one or more cameras 160. The images stored in the image cache 240 include metadata about which camera 160 captured each image. Additionally, each image may include a timestamp of when the image was captured by the camera 160.

The load data store 250 stores load sensor data received from the one or more load sensors 170. The load data includes metadata about which load sensor 170 captured each data point. Additionally, each data point of load sensor data may include a timestamp of when the data was captured by the load sensor 170. Sets of multiple individual load data points in a time series may be referred to herein as a load curve of the data.

In some embodiments, the load data includes an indication of which load sensor generated which portions of the load data. The indication may specifically identify the load sensor. For example, each measurement or set of measurements in the load data may be associated with an identifier for the load sensor that captured the measurement or set of measurements. Alternatively, the indication may include structuring the load data such that load data from a particular load sensor can be implicitly identified based on the positioning of the load data in the structure. For example, the load data may be concatenated into a large set of load data, and the load data from a load sensor is positioned in the concatenation based on a predetermined ordering of the load sensors. In some embodiments, an embedding may be generated for a set of load data from each load sensor, and the embeddings may be concatenated according to a predetermined ordering of the load sensors.

The item detection module 260 detects that an item has been added to the shopping cart 110 (or removed from the cart). In one embodiment, the item detection module 260 may detect that an item has been added to the shopping cart 110 using inputs from sensors on the shopping cart 110. In one embodiment, the item detection module 260 uses trained machine learning models from the model store to predict that an item has been added or removed from the shopping cart 110. In some embodiments, the item detection module 260 uses information from the image data received from the cameras 160 that movement has been detected in the shopping cart 110 to determine that an item has been moved into or out of the cart. Similarly, in some embodiments, the item detection module 260 may use information from the load sensors, such as detected change in load of the contents of the shopping cart 110 to determine that an item has been added to or removed from the shopping cart 110. In alternative embodiments, the shopping cart 110 may include additional sensors, such as accelerometers or laser sensors that can be triggered by items being moved into the shopping cart 110.

When the item detection module 260 receives a trigger and determines that an item has been added to the shopping cart 110, the item detection module determines a timeframe that should be used by the detection system 130 to identify the item. In one embodiment, the item detection module 260 may identify a time range that begins some predetermined amount of time before the item detection occurred and that ends some predetermined amount of time after the item detection occurred. For example, if the item detection module 260 determines that an item has been added to the shopping cart at time 10 the item detection module 260 may then determine that data within a time range of 200 milliseconds before 10 and 200 milliseconds after 10 should be used as input to an item recognition model for identifying the item. In another embodiment, the item detection module 260 may use images and load data received at the time the item was detected as inputs to a machine learning model that determines how broad a time range around the item detection time should be for providing further image and load data to item identification models (e.g., a timestamp detection model that identifies a set of timestamps that are most likely to correspond to the item being placed in the storage area of the shopping cart 110). The timeframe determined by the item detection module 260 makes it possible for the detection system 130 to analyze only input data that is important for predicting the identity of an item, rather than analyzing all input data as it is received.

In one embodiment, the detection system 130 provides the load data from the determined time range and the image data from the determined time range to the sensor fusion module 270 to identify the item that was added to the shopping cart 110. The sensor fusion module 270 provides the load data and image data to a trained item recognition model. The item recognition model may use the load data information to identify the area of the shopping cart 110 where the item was placed. Relatedly, the item recognition model can use the load data to determine the portions of the image frames in the image data that are likely to include the newly added item. The sensor fusion module 270 outputs a predicted identification of the item that was added to the shopping cart 110. In one embodiment, the sensor fusion module 270 may use multiple models to identify the item. For example, the sensor fusion module 270 may apply a model that takes in the load data and the image data from the determined time range and outputs one or more of the input image frames with bounding boxes around the area of the item that was added (or another location identifier). The sensor fusion module 270 may then apply an image classification model to the portions of the image frames within the bounding boxes to identify the item (e.g., by detecting barcodes in the image data or otherwise analyzing the image data within the bounding boxes).

In another embodiment, the detection system 130 provides the load data to a load identification module 280 to predict the identity of the newly added item. The load identification module 280 obtains the load data that was collected from the load sensors 170 at time stamps during the time range that was determined by the item detection module 260 to be related to the item being placed in the shopping cart 110. That is, the load identification module 280 obtains a load curve for each of the load sensors 170, where the load curve includes the time series of load data recorded at each of the load sensors 170. The load identification module 280 applies a trained machine learning model that is trained to recognize the identity of the item given the load curve data. The load identification module 280 outputs the predicted identification of the item.

Figure 3:
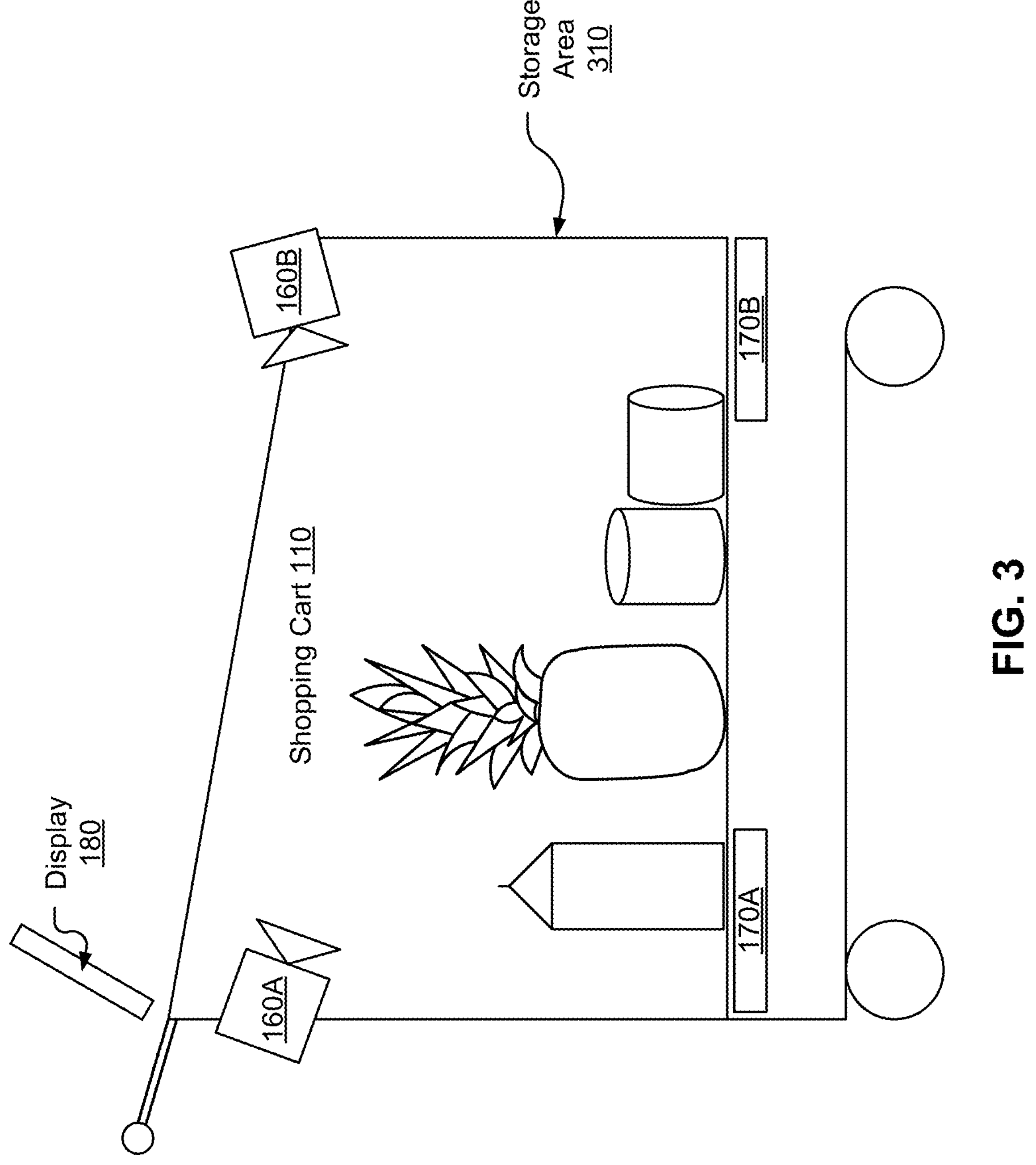
FIG. 3 is an illustration of a shopping cart, in accordance with one or more example embodiments.

FIG. 3 is an illustration of a shopping cart 110, in accordance with one or more example embodiments. The shopping cart 110 includes cameras 160A and 160B, load sensors 170A and 170B, a display 180, and a storage area 310. In various embodiments, more or fewer cameras 160 and more or fewer load sensors 170 may be used in a shopping cart 110. The storage area 310 is used to hold items. For example, FIG. 3 shows a storage area 310 with two cans, a pineapple, and a carton of milk. The display 180 may provide information to the user of the shopping cart about the items inside the storage area 310, such as a list of the items, the total cost of the shopping cart contents, and any available coupons or discounts associated with the items in the shopping cart 110.

Figure 4:
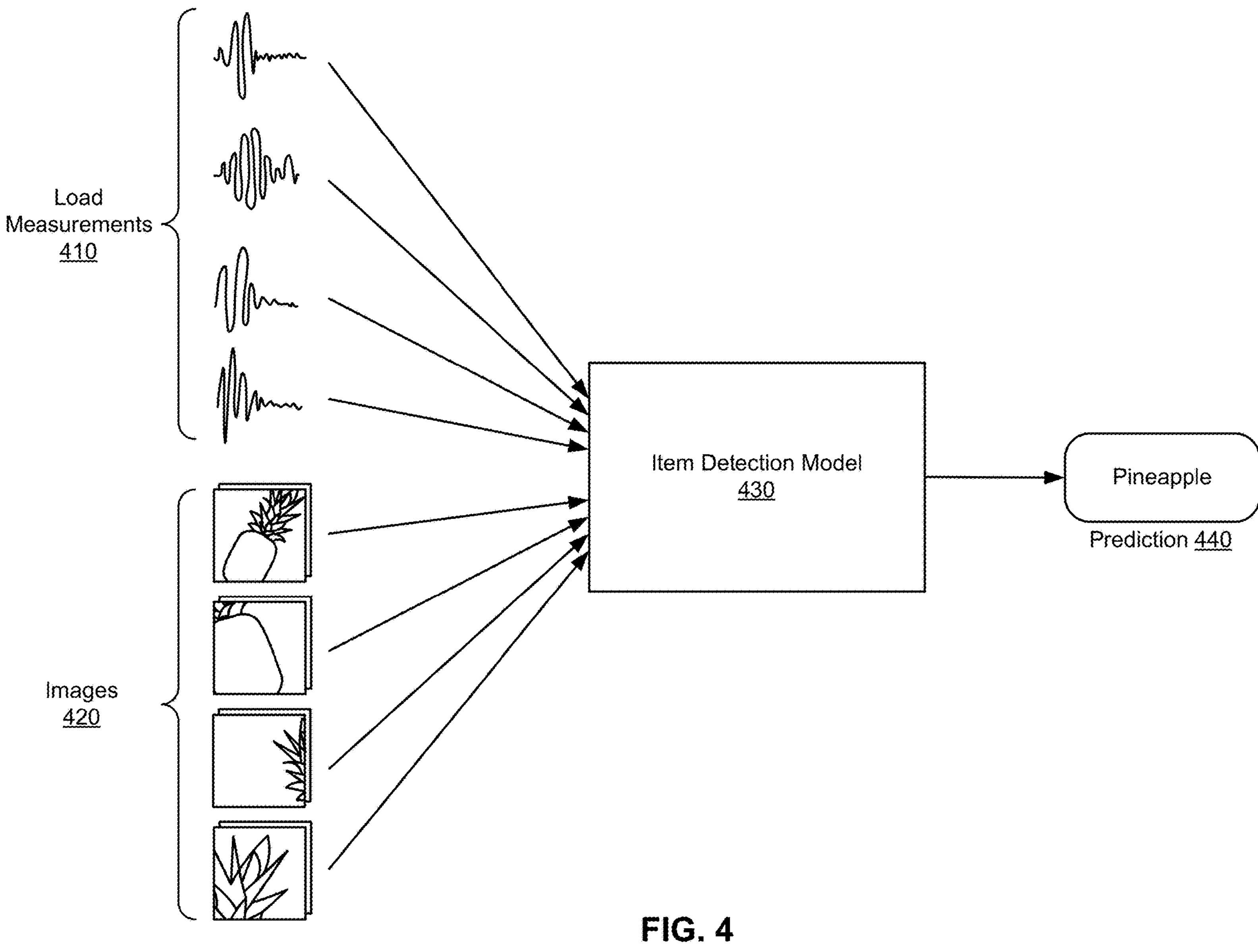
FIG. 4 is a high-level diagram of a process for applying a sensor fusion model, in accordance with one or more example embodiments.

FIG. 4 is a high-level diagram of a process for applying a sensor fusion model 430. A sensor fusion model 430 may be one of the models used by the item recognition module 270 to predict a classification of the type of item that has been added to the shopping cart 110. Training the sensor fusion model 430 may be managed by the model training module 220 and may include providing labeled example inputs of image data and load data to the model and then updating the model parameters based on a comparison of the model output to the labels. In the example of FIG. 4, the sensor fusion model 430 is applied to load measurements 410 and images 420. The example load measurements 410 include load curves from each of four load sensors 170 on a shopping cart 110 that each detected load changes in the shopping cart storage area 310 when a pineapple was added to the shopping cart. The load measurements 410 are load data over the course of a timeframe (e.g., each load curve is set of load values taken at timestamps throughout the timeframe) associated with the pineapple being added to the shopping cart 110 (represented in FIG. 4 by load curves connecting the load data points). The example images 420 include sets of In one embodiment, the load measurements 410 and images 420 are provided as input to the sensor fusion model 430, which outputs a prediction 440 based on its current weight parameters.

FIG. 5 is a flowchart illustrating an example method for identifying an item added to a shopping cart 110 using the load identification module 280, in accordance with one or more example embodiments. Alternative embodiments may include more, fewer, or different steps and the steps may be performed in a different order from that illustrated in FIG. 5.

The detection system 130 receives 510 load data captured by each of a plurality of load sensors coupled to a different location of a storage area of a shopping cart. The load data from each load sensor 170 (e.g., "partial load data") comprises a load measurement sensed by the load sensor at each of a series of timestamps. The detection system detects 520 that an item was added to the storage area of the shopping cart during one or more of the series of timestamps of the load data and identifies 530 a set of load measurements from each of the plurality of load sensors 170 during the one or more timestamps when the item is added. The item recognition module 270 applies 540 an item recognition model to the load data to generate an item identifier prediction for the item. The item recognition model is a machine learning model that is trained to identify items based on load data from a plurality of load sensors. The item recognition module 270 may store the generated item identifier prediction for the item.

Figure 6:
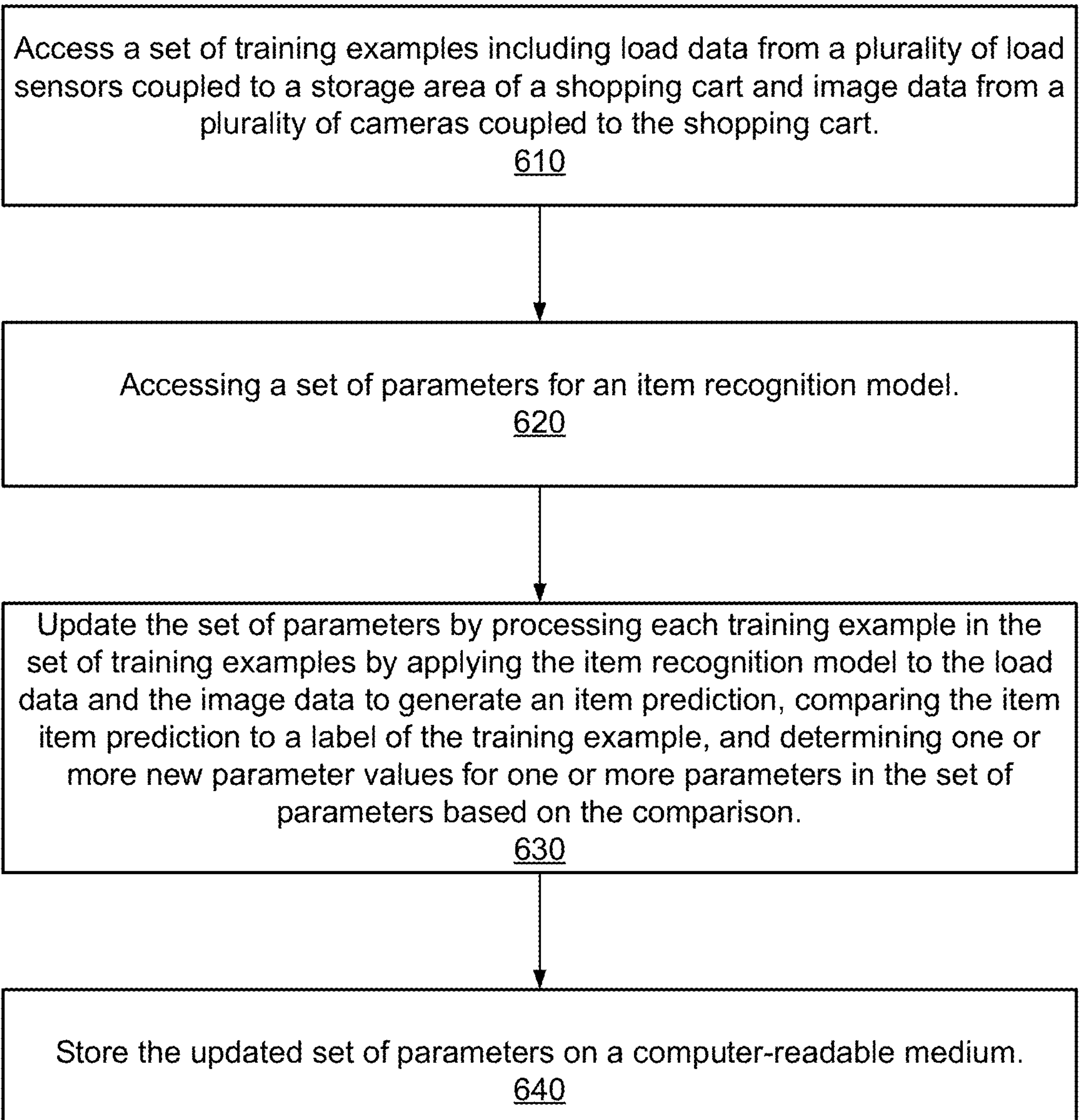
FIG. 6 is a flowchart illustrating an example method for training a machine learning model of a sensor fusion module to identify items added to a shopping cart, in accordance with one or more example embodiments.

FIG. 6 is a flowchart illustrating an example method for training a machine learning model of the sensor fusion module 270 to identify items added to a shopping cart 110, in accordance with one or more example embodiments. Alternative embodiments may include more, fewer, or different steps and the steps may be performed in a different order from that illustrated in FIG. 6.

The detection system 130 accesses 610 a set of training examples. The training examples may include load data captured from a plurality of load sensors that are coupled to a storage area 310 of a shopping cart 110. The load data from each load sensor (e.g., "partial load data") of the plurality of load sensors describes a load imparted by an item in the storage area 310 at a different location of the storage area 310. The training examples may also include image data captured by a plurality of cameras 160 that are coupled to the shopping cart 110. The image data from each camera 160 (e.g., "partial image data") depicts an item within a field of view of a portion of the storage area 310 of the shopping cart 110. The training examples also include a label comprising an item identifier for the item.

To train the item recognition model, the model training module 220 accesses 620 the set of parameters. The model training module 220 then updates 630 the set of parameters based on each training example in the set of training examples. Updating the set of parameters may result in an updated set of parameters for the item recognition model. Updating the set of parameters includes applying the item recognition model to the load data and the image data of the training example to generate an item identifier prediction for the item, comparing the item identifier prediction to the item identifier from the label of the training example, and determining one or more new parameter values for one or more parameters in the set of parameters based on the comparison of the item identifier prediction and the item identifier. The detection system 130 stores 640 the updated set of parameters on a computer-readable medium for later access and application during model deployment.

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. An item recognition system comprising:

a shopping cart comprising a storage area;

a plurality of load sensors coupled to the storage area of the shopping cart, wherein each load sensor is configured to capture partial load data describing a load imparted by an item on the storage area of the shopping cart at a different location of the storage area;

a plurality of cameras coupled to the shopping cart, wherein each camera of the plurality of cameras coupled to the shopping cart is configured to capture partial image data depicting the item within a field of view of a portion of the storage area of the shopping cart;

a processor; and a non-transitory computer-readable medium storing a set of parameters for an item recognition model trained to predict an item identifier for an item based on load data describing a load imparted by an item and image data depicting the item, wherein the set of parameters for the item recognition model were generated by training the item recognition model based on a plurality of training examples comprising load data for an item, image data depicting the item, and a label indicating an item identifier for the item;

wherein the non-transitory computer-readable medium further stores instructions that, when executed by the processor, causes the processor to perform operations comprising:

capturing load data by the plurality of load sensors, wherein the load data describes a load imparted by an item on the storage area at the different locations of the storage area;

capturing image data by the plurality of cameras, wherein the image data comprises images depicting the item from the fields of view of the portions of the storage area of the shopping cart;

applying the item recognition model to the captured load data and the captured image data to generate an item identifier prediction for the item, wherein applying the item recognition model comprises applying the stored set of parameters for the item recognition model to the captured load data and the captured image data; and updating a list of items to indicate that the item is located within the storage area based on the item identifier prediction generated by the item recognition model.

2. The item recognition system of claim 1, wherein applying the item recognition model to the captured load data and the captured image data to generate an item identifier prediction comprises:

generating a bounding box within an image frame of the captured image data identifying a portion of the image data that corresponds to the item based on the captured load data.

3. The item recognition system of claim 2, wherein applying the item recognition model to the captured load data and the captured image data to generate an item identifier prediction comprises:

applying a second model to the image data within the bounding box to identify the item.

4. The item recognition system of claim 1, wherein the load data identifies which of the plurality of load sensors captured corresponding partial load data.

5. The item recognition system of claim 1, wherein the load data comprises a set of load measurements over a timeframe captured by each of the plurality of load sensors.

6. The item recognition system of claim 1, wherein applying the item recognition model to generate the item identifier prediction comprises identifying a barcode affixed to the item.

7. The item recognition system of claim 1, further comprising a display and wherein the operations further comprise:

updating a user interface presented on the display to include content describing the identified item.

8. A non-transitory computer-readable medium storing instructions that, when executed by a processor, cause the processor to perform operations comprising:

capturing load data by a plurality of load sensors coupled to a storage area of a shopping cart, wherein the load data comprises partial load data describing a load imparted by an item on the storage area at different locations of the storage area;

capturing image data by a plurality of cameras coupled to the shopping cart, wherein the image data comprises partial image data captured by each of the plurality of cameras, wherein the partial image data captured by a camera depicts the item from a different field of view of a portions of the storage area of the shopping cart;

applying an item recognition model to the captured load data and the captured image data to generate an item identifier prediction for the item, wherein the item recognition model is trained to predict an item identifier for an item based on load data describing a load imparted by an item and image data depicting the item, wherein a set of parameters for the item recognition model were generated by training the item recognition model based on a plurality of training examples comprising load data for an item, image data depicting the item, and a label indicating an item identifier for the item, wherein applying the item recognition model comprises applying a set of parameters for the item recognition model to the captured load data and the captured image data, wherein the set of parameters for the item recognition model are stored by the computer-readable medium; and updating a list of items to indicate that the item is located within the storage area based on the item identifier prediction generated by the item recognition model.

9. The computer-readable medium of claim 8, wherein applying the item recognition model to the captured load data and the captured image data to generate an item identifier prediction comprises:

generating a bounding box within an image frame of the captured image data identifying a portion of the image data that corresponds to the item based on the captured load data.

10. The computer-readable medium of claim 9, wherein applying the item recognition model to the captured load data and the captured image data to generate an item identifier prediction comprises:

applying a second model to the image data within the bounding box to identify the item.

11. The computer-readable medium of claim 8, wherein the load data identifies which of the plurality of load sensors captured corresponding partial load data.

12. The computer-readable medium of claim 8, wherein the load data comprises a set of load measurements over a timeframe captured by each of the plurality of load sensors.

13. The computer-readable medium of claim 8, wherein applying the item recognition model to generate the item identifier prediction comprises identifying a barcode affixed to the item.

14. The computer-readable medium of claim 8, the operations further comprising:

updating a user interface presented on a display of the shopping cart to include content describing the identified item.

15. A method comprising:

capturing load data by a plurality of load sensors coupled to a storage area of a shopping cart, wherein the load data comprises partial load data describing a load imparted by an item on the storage area at different locations of the storage area;

capturing image data by a plurality of cameras coupled to the shopping cart, wherein the image data comprises partial image data captured by each of the plurality of cameras, wherein the partial image data captured by a camera depicts the item from a different field of view of a portions of the storage area of the shopping cart;

applying an item recognition model to the captured load data and the captured image data to generate an item identifier prediction for the item, wherein the item recognition model is trained to predict an item identifier for an item based on load data describing a load imparted by an item and image data depicting the item, wherein a set of parameters for the item recognition model were generated by training the item recognition model based on a plurality of training examples comprising load data for an item, image data depicting the item, and a label indicating an item identifier for the item, wherein applying the item recognition model comprises applying a set of parameters for the item recognition model to the captured load data and the captured image data; and updating a list of items to indicate that the item is located within the storage area based on the item identifier prediction generated by the item recognition model.

16. The method of claim 15, wherein applying the item recognition model to the captured load data and the captured image data to generate an item identifier prediction comprises:

generating a bounding box within an image frame of the captured image data identifying a portion of the image data that corresponds to the item based on the captured load data.

17. The method of claim 16, wherein applying the item recognition model to the captured load data and the captured image data to generate an item identifier prediction comprises:

applying a second model to the image data within the bounding box to identify the item.

18. The method of claim 15, wherein the load data identifies which of the plurality of load sensors captured corresponding partial load data.

19. The method of claim 15, wherein the load data comprises a set of load measurements over a timeframe captured by each of the plurality of load sensors.

20. The method of claim 15, wherein applying the item recognition model to generate the item identifier prediction comprises identifying a barcode affixed to the item.

* * * * *